United States Patent [19]

Watanabe et al.

[11] Patent Number: 5,256,247

[45] Date of Patent: Oct. 26, 1993

[54] LIQUID ETCHANT COMPOSITION FOR THIN FILM RESISTOR ELEMENT

[75] Inventors: Takayoshi Watanabe, Fujisawa; Takashi Inoue, Yokohama; Hitoshi Oka, Yokohama; Minoru Tanaka, Yokohama, all of Japan

[73] Assignee: Hitachi, Ltd., Tokyo, Japan

[21] Appl. No.: 795,486

[22] Filed: Nov. 21, 1991

[30] Foreign Application Priority Data

Nov. 21, 1990 [JP] Japan .................. 2-314055

[51] Int. Cl.⁵ .............................................. C23F 1/00
[52] U.S. Cl. ................... 156/653; 156/656; 156/657; 156/662; 252/79.3
[58] Field of Search ............... 156/656, 657, 662, 667, 156/653; 252/79.3

[56] References Cited

U.S. PATENT DOCUMENTS

| | | | |
|---|---|---|---|
| 3,524,817 | 8/1970 | Roy et al. ........................ | 252/79.3 |
| 4,370,197 | 1/1983 | Abolafia et al. ................. | 156/664 X |
| 4,477,364 | 10/1984 | Garcia ............................ | 252/79.3 X |
| 4,588,471 | 5/1986 | Griffith et al. .................. | 156/656 X |
| 4,970,014 | 11/1990 | Garcia ............................ | 156/655 X |
| 5,091,053 | 2/1992 | Blonder et al. ................. | 252/79.3 X |

FOREIGN PATENT DOCUMENTS 60-83301 11/1985 Japan .

*Primary Examiner*—Thi Dang
*Attorney, Agent, or Firm*—Antonelli, Terry, Stout & Kraus

[57] ABSTRACT

A resistor material having at least chromium, silicon and oxygen, $Cr.SiO_2$, contained in electronic integrated circuits, particularly in the case of an aluminum layer being on the material, is etched with a liquid etchant composition containing 1.92 to 2.64 mol/l of hydrochloric acid, 0.26 to 0.77 mol/l of phosphoric acid, 5 to 10 mol/l hydrofluoric acid and 3.2 to 5.4 mol/l of ammonium fluoride.

5 Claims, 2 Drawing Sheets

LIQUID ETCHANT COMPOSITION FOR THIN FILM RESISTOR ELEMENT

BACKGROUND OF THE INVENTION

1. Field of the Invention

The present invention relates to a liquid etchant composition for use in fabrication of a thin film resistor element in an electronic circuit, comprising chromium, silicon and oxygen (hereinafter referred to as "$Cr.SiO_2$"), more particularly to a liquid etchant composition for use in etching the $Cr.SiO_2$ resistor material having an aluminum layer applied as conductor thereon, with an undercut-free shape at the pattern edge of the aluminum layer and a process for etching the $Cr.SiO_2$ resistor material in an easy and controllable manner. Furthermore, the liquid etchant composition of the present invention is more suitable and useful when the resistor film is formed on an organic insulating film such as a polyimide film.

2. Description of Related Art

Electronic integrated circuits used in a computer are terminated with resistors having the same resistance as that of a transmission line impedance for the purpose of obtaining impedance matching between the circuit elements and the transmission line to inhibit reflection noise generated in transmitting high-speed digital signals. That is, a so-called impedance matching by signal termination resistors has been adopted in the integrated circuit application systems. Therefore, termination resistors must be arranged in or about a package at the same time when the integrated circuits are to be packaged on a board, thereby terminating the transmission line.

Hitherto, resistors for the impedance matching have been externally mounted as independent parts on printed circuit boards or multichip module boards. However, the external mounting of the independent parts is improper for miniaturization of the integrated circuits and improvement of packaging density.

Built-in resistor elements contained in packaging boards could greatly improve the packaging density of the integrated circuits. In a method therefor which has been proposed, a thin film resistor is formed on the surface of a certain layer of a packaging board having a multilayered structure, and the thin film is then fabricated by photoetching into an element shape to have a desired resistance. According to this method, the packaging density cannot only be improved but also a high resistance-accuracy termination resistor element can be formed, and further the length of wirings can be shortened so that the signal-propagating speed is greatly improved.

As a resistor material useful for built-in resistor element in the packaging board has been developed. The material is a composite of $SiO_2$ and Cr metal which is deposited as thin film by RF magnetron sputtering (see H. Matino and T. Ushida, "Effect of Substrate Bias on Properties of RF-Sputtered $Cr.SiO_2$ Films", IBM J. RES. DEVELOP., November 1977, pp. 576-579). The liquid etchant composition for this resistor material has been demanded.

In order to secure an ohmic contact between the terminating resistor element and the upper wiring, it is desired that the resistor film and the wiring film are formed in a continuous deposition process. On the other hand, this method has a problem that an adequate pattern-forming accuracy is hardly obtained when the wiring film is thick. It is known that this problem has been overcome to secure formation of the high-accuracy resistor pattern by providing a thin wiring film and then forming a two-layer film pattern of the resistor material and the wiring material in a continuous manner by a photoetching process and thereafter forming a film of the wiring material which has a desired thickness to form a termination resistor pattern.

Moreover, large-scaled computers or supercomputers have a tendency to use a thin film multilayered wiring board using an organic insulating material having a low dielectric constant, such as polyimide, in a packaging board such as a microchip carrier or multichip module board for the purpose of shortening the package-originated signal propagation delay. Now, the abovementioned termination resistor element has been necessitated to be formed on the organic insulating film, for example, polyimide.

As prior etching compositions for etching the $Cr.SiO_2$ resistor material film is known a liquid mixture (or mix) of nitric acid and hydrofluoric acid as disclosed in Japanese Patent KOKAI (Laid-Open) No. 60-83301. However, this liquid mixture has two problems when used for etching a laminate comprising the $Cr.SiO_2$ film and an aluminum layer on the film (hereinafter referred to as "$Al/Cr.SiO_2$ laminate"): the first problem is that the resistor film is undercut so that the aluminum layer forms an eave (see FIG. 1D attached hereto) and the second problem is that the etch residues are easily produced when the $Cr.SiO_2$ film is etched by the prior etchant. In the first problem, an aluminum electrode film in cracked at the $Cr.SiO_2$ pattern edge when applied in the subsequent electrode deposition step onto the $Al/Cr.SiO_2$ laminate. The cracks propagate from the eave region through, whole Al film to finally reach the top Al surface. FIGS. 2A to 2D show an etching process showing schematical cross-sectional views of a sample at each step. In these figures, reference number 1 denotes a patterned photoresist, 2 an aluminum layer, 3 a $Cr.SiO_2$ layer, 4 a polyimide layer, 5 a ceramic or glass substrate and 6 etch residues. FIG. 2A shows the sample having a patterned photoresist film and unetched $Al/Cr.SiO_2$ laminate. FIG. 2B shows the sample having the etched $Al/Cr.SiO_2$ laminate. FIG. 2C shows the sample having the photoresist removed. FIG. 2D shows the sample having a thick aluminum electrode formed thereon and illustrates that microcracks 8 are produced in the Al electrode during or after the deposition of the electrode when the resistor film has undercut. It shows that the microcrack occurs because of insufficient Al coverage caused by the undercut of the resistor film. These microcracks may be a cause of the open failure of the aluminum electrode, which deteriorate the reliability of integrated circuits. If the aluminum eave is large enough, it falls down and therefore the Al electrode is badly deformed. In the second problem, the residues are more easily produced particularly when the $Cr.SiO_2$ film is deposited on the organic insulating film of polyimide or the like. Therefore, there arise problems caused by the etch residues, that is, a bad effect on pattern-wise etching of underlying polyimide or adhesion damage between the polyimide and a next thin film on that.

SUMMARY OF THE INVENTION

The primary object of the present invention is to provide a liquid etchant composition for etching the Cr.SiO$_2$ resistor material of the Al/Cr.SiO$_2$ laminate used in an electronic integrated circuit, with the aluminum layer being free of undercutting so that microcrack propagation in the aluminum layer at the edges of the resistor film pattern is inhibited during the subsequent step of the aluminum electrode deposition and with no etch residues being produced on the board.

The secondary object of the present invention is to provide a method of etching the Cr.SiO$_2$ resistor material, particularly of the Al/Cr.SiO$_2$ laminate as mentioned above.

DETAILED DESCRIPTION OF PREFERRED EMBODIMENTS

Figure 1A:
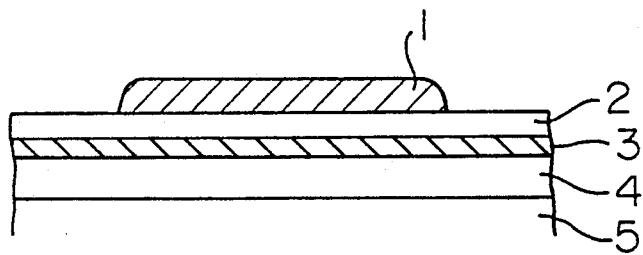
FIGS. 1A, 1B, 1C, 1C', 1D and 1D' are schematical cross-sectional views of a sample showing a flow chart of the etching process for etching the Cr.SiO$_2$ resistor material with a liquid etchant composition according to an embodiment of the present invention and a prior etchant composition.
Figure 1B:
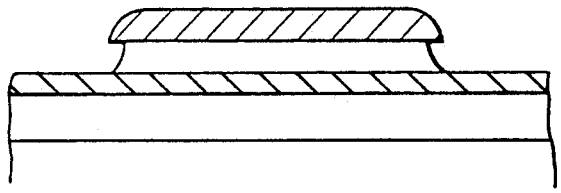

In accordance with the present invention, a sintered material comprising a silica matrix and metallic chromium fine particles dispersed in the matrix, referred to as Cr.SiO$_2$, is used as sputtering target material for resistor film deposition, and aluminum is used as electrode and wiring materials.

A laminate comprising a resistor film and a thin electrode film must be subjected to the patterning process by a photoetching to form an isolated pattern. From the standpoint of simplifying the process, it is desired that the photoetching is conducted in one step to form the laminate patterns. Furthermore, the liquid etchant composition should be such that it can form the Al/Cr.SiO$_2$ laminate with an undercut-free shape at the edge of the laminate pattern to secure an aluminum electrode film coverage at the edge of the laminate pattern and inhibit the formation of cracks in the aluminum layer.

In order to achieve the abovementioned objects of the present invention, the present inventors have found a novel etchant composition for etching the Cr.SiO$_2$ resistor material of the Al/Cr.SiO$_2$ laminate.

The present liquid etchant composition should have (1) an adequate etching power for both chromium and SiO$_2$, (2) a proper etching power for aluminum as well, which realizes undercut-free shape of Cr.SiO$_2$ resistor film together with normally tapered thin Al electrode edge at the pattern end of Al/Cr.SiO$_2$ laminate, and (3) a proper etching rate.

In accordance with the present invention, the acceptable maximum undercut is 0.5 μm though no undercut is favorable.

Firstly, a reagent for etching each of the three components, aluminum, chromium and SiO$_2$ is selected as a base component. To the mixture of these reagents is added ammonium fluoride which is experimentally known to effectively increase the adhesion of a photoresist during the etching procedure and further added phosphoric acid which was determined to be effective for promoting the etching of the Cr.SiO$_2$ material, whereby the object of the present invention has been achieved.

The etching action of the liquid etchant composition according to the present invention will be in detail explained below.

Etching of the Cr.SiO$_2$ material with a prior etchant composition proceeds in two stages. The etching rate is higher at the earlier stage to remove a major part of the material and at the subsequent stage the etching rate is lower because of a slowly-etched layer and, therefore, a major part of the etching time is consumed to remove the slowly-etched layer. That is, the film of the Cr.SiO$_2$ material is composed of two kinds of stacked layers which are different in their properties from each other. The presence of the slowly-etched layer causes the unstability of the etching time and the formation of etch residues. Particularly, when the undercoat is of an organic material such as polyimide, this tendency increases. To completely remove such obstinate etch residues, the overetching period tends to exceed to finally bring about the great undercut in the Cr.SiO$_2$ layer.

The liquid etchant compositions of the present invention can provide an undercut-free shape at the edge of the Al/Cr.SiO$_2$ laminate pattern and have an adequate etching capacity even when the laminate is applied on the organic insulating film of, for example, polyimide which facilitates the formation of the etch residues. The liquid etchant composition of the present invention is characterized by containing hydrochloric acid for etching chromium, hydrofluoric acid and ammonium fluoride for etching silica, phosphoric acid for strengthening the etching composition and ammonium fluoride for improving the adhesion of resists.

The present inventors, as a result of their extensive study, have found that the etching liquid composition of the present invention should preferably have the following concentration for each of the components:

| | |
|---|---|
| hydrochloric acid | 1.92–2.64 mol/liter |
| phosphoric acid | 0.26–0.77 mol/liter |
| hydrofluoric acid | 5–10 mol/liter |
| ammonium fluoride | 3.2–5.4 mol/liter. |

If the concentration of the hydrochloric acid is lower than the range above, the undercut amount of the Cr.SiO$_2$ material increases so that the undercut-free shape cannot be formed (see Example 8 below). The concentration exceeding the range, on the other hand, brings about the same results (see Example 10). If the concentration of the phosphoric acid is lower than the range above, there occurs a problem of etch residues of the Cr.SiO$_2$ layer (see Example 11). If the concentration of the phosphoric acid exceeds the range, on the other hand, there arises no etch residue at all but the undercut amount increases. (see Example 12). If the concentration of the hydrofluoric acid is lower than the range above, there is a problem of pattern edge deformation in the Cr.SiO$_2$ resistor film. (see Example 6). If the concentration of the hydrofluoric acid exceeds the range, on the other hand, the undercut amount of the Cr.SiO$_2$ resistor film increases. (see Example 4). If the concentration of the ammonium fluoride is lower than the range above, the adhesion of photoresists is poor and a small amount of the Cr.SiO$_2$ resistor film is undercut (see Example 13). If the concentration of the ammonium fluoride exceeds the range, on the other hand, a large amount of the etch residues appear, although the undercut-free shape of the pattern edge of the Al/Cr.SiO₂ laminate can be obtained (see Example 14).

The Cr.SiO₂ etchant composition of the present invention is also effective for the Cr.SiO₂ thin film material applied on a substrate of an inorganic material such as glasses, ceramics or silicon semiconductors, as well as on the organic material such as polyimide.

The present invention will be illustrated below with reference to some examples.

EXAMPLES

The testing method used in these examples are as follows:

An alumina ceramic substrate or a glass substrate of 10 cm × 10 cm square has been used as a base board. Polyimide vanish was spin-coated on these substrates, then baked and cured at a suitable temperature. The final thickness of the polyimide coating was 14 μm. The coated substrates were placed in a sputtering apparatus and dried by heating under vacuum. Then, a Cr.SiO₂ (Cr:SiO₂ ratio = 66 wt %:34 wt %) film and an aluminum film were continuously deposited in this order by sputtering. The sputtering conditions were as follows:

1) Cr.SiO₂ sputtering
   RF Power Input      1.0 kw (2 min.)
                       0.5 kw (2 min.)
                       0.25 kw (2 min.)
   Argon pressure = 0.2 Pa
2) Aluminum sputtering
   DC Power Input (DC) = 4.0 kw (8 min. and 40 sec.)
   Argon pressure = 0.2 Pa
3) Thickness of Cr.SiO₂ film = 2000 Å
4) Thickness of aluminum film = 4000 Å

A positive-type photoresist pattern was applied on the Al/Cr.SiO₂ laminate under predetermined conditions. Then, the aluminum film was etched using the resist pattern as a mask. The etching conditions were as follows:

1) Liquid Etchant Composition:
   phosphoric acid         78 parts by volume
   nitric acid              2 parts by volume
   acetic acid             15 parts by volume
   water                    5 parts by volume
2) Liquid Temperature:    40° C.
3) Etching Period:        Just etch time + 30 seconds The aluminum etchant was prepared as mentioned above, and heated to a predetermined temperature in a water bath, into which the substrates were dipped and left to stand to thereby etch the aluminum film. The procedures above were the same for all the sample substrates. Thereafter, the various Cr.SiO₂ etchant compositions as shown in Table 1 were prepared, in which the aluminum-etched sample substrates were etched under the abovementioned conditions while being vibrated. Then, the sample substrates were subjected to the washing, drying and resist-stripping by a resist stripper.

TABLE 1

| | Component | | | | | | Etching time sec | Etch residues | Adhesion of resist | Undercut amount μm | Shape of pattern |
|---|---|---|---|---|---|---|---|---|---|---|---|
| | HF | HCl | H₃PO₄ | NH₄F | HNO₃ | KCl | H₂O | | | | | |
| Example | | | | | | | | | | | | |
| 1 | 7.5 | 1.92 | 0.77 | 4.32 | | | | 30 | none | ○ | 0.2 | ○ |
| 2 | " | " | 0.51 | " | | | | " | " | " | 0.3 | " |
| 3 | " | 2.40 | " | " | | | | " | " | " | 0.0 | " |
| 4 | " | 2.64 | " | " | | | | 30 | " | ○ | 0.2 | ○ |
| Comp. Ex. | | | | | | | | | | | | |
| 1 | 2 | | | | 3 | | 60 | 105 | yes | X | 10 | X |
| 2 | 1 | | | 7 | | | | (Etching could not be effected.) | | | | |
| 3 | 1 1.75 | * | | | | | | 90 | yes | X | 7 | ○ |
| 4 | 12.5 | 1.92 | | | | 2.01 | | 30 | " | X | 0.0 | X |
| 5 | 11.3 | " | | 4.32 | | 1.07 | | " | " | ○ | 0.0 | ○ |
| 6 | 7.5 | 0.96 | 6.12 | | | | | 30 | none | ○ | 5 | ○ |
| 7 | 10.0 | 1.92 | 1.02 | 4.32 | | | | " | " | ○ | 1 | ○ |
| 8 | 7.5 | " | " | " | | | | " | " | ○ | 0.8 | ○ |
| 9 | 5.0 | " | " | " | | | | " | " | ○ | 0.4 | Δ |
| 10 | 7.5 | 2.40 | 0.26 | " | | | | " | yes | ○ | 0.0 | ○ |
| 11 | " | " | 0.77 | " | | | | " | none | ○ | 1.5 | ○ |
| 12 | " | " | 0.51 | 5.74 | | | | " | " | X | 0.1 | ○ |
| 13 | " | " | " | 5.40 | | | | " | yes | ○ | 0.0 | ○ | in parts by volume (the other in mol/l)
*amount of polyethylene glycol added

Figure 1C:
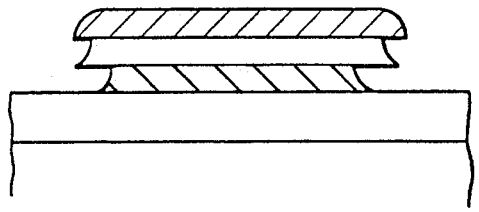
Figure 1C:
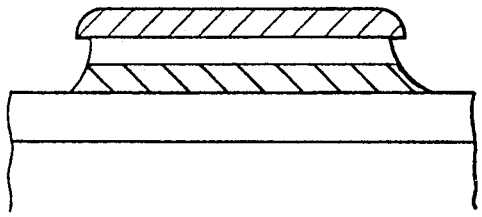
Figure 1D:
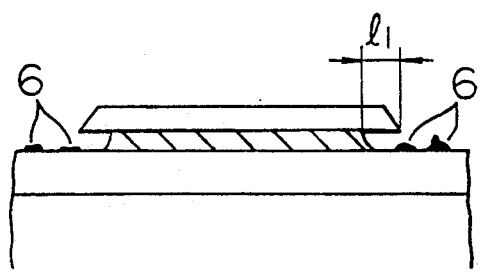
Figure 1D:
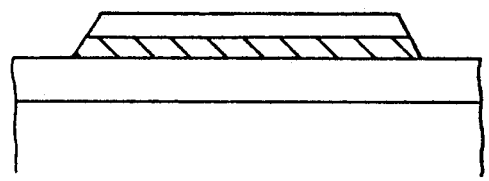
Figure 2A:
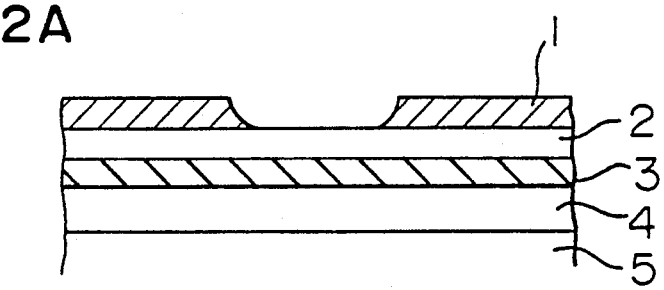
FIGS. 2A, 2B, 2C and 2D are schematical cross-sectional views of a sample illustrating the mechanism for producing microcracks in an aluminum electrode.
Figure 2B:
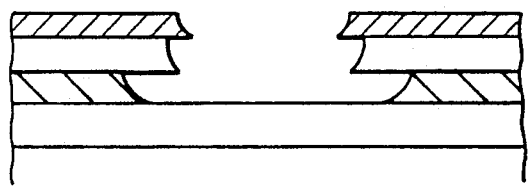
Figure 2C:
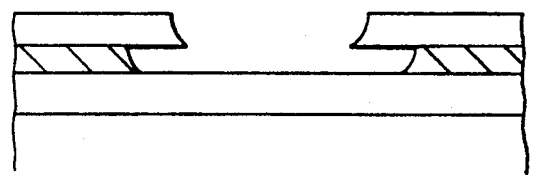
Figure 2D:
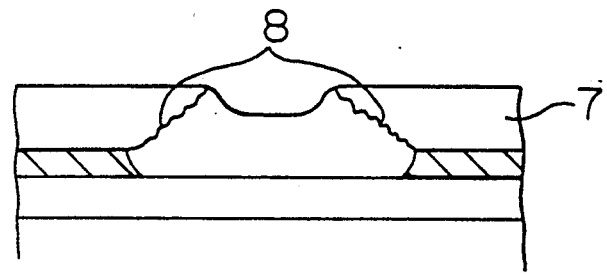

The etching process as mentioned above is illustrated in FIGS. 1A to 1D and 1A to 1D' showing the schematical cross-sectional views of the sample in each step. In these figures, reference number 1 denotes a resist pattern, 2 an aluminum layer, 3 a Cr.SiO₂ layer, 4 a polyimide layer, 5 a substrate, 6 etch residues and l₁ an undercut amount of the Cr.SiO₂ layer. The shape of the edge of the Al/Cr.SiO₂ laminate after the Cr.SiO₂ layer was etched is shown in FIG. 1C for etching by a prior liquid etchant composition and in FIG. 1C' for etching by the liquid etchant composition of the present invention. the resist-removed state of the Al/Cr.SiO₂ laminate is shown in FIG. 1D. In this figure, l₁ is a length of the eave, i.e., a distance from the end of the aluminum layer to the end of the undercut Cr.SiO₂ layer. This is referred to as the "undercut amount". According to the present invention, a novel liquid etchant composition giving l₁ = zero (0) has been found.

In the present invention, the presence of the etch residues of Cr.SiO₂ is observed on the polyimide surface by an X-ray microprobe analyzer. The adhesion of the resist is visually inspected after the etching of Cr.SiO₂ or during the washing of etched Cr.SiO₂ with water. The pattern shape is observed by SEM.

In Table 1, Comparative Example No. 1 uses a prior liquid etchant composition composed of hydrofluoric acid and nitric acid. This example presented no satisfactory result in any etch performance item. The mixture of hydrofluoric acid and ammonium fluoride used in Comparative Example 2 did not work for etching $Cr.SiO_2$. In Comparative Example 3, the composition is a mixture of hydrofluoric acid and polyethylene glycol which is a viscosity enhancer. The etching of $Cr.SiO_2$ was possible with this solution but the undercut amount was 7 μm and the eave was formed in the aluminum layer and the etch residues of $Cr.SiO_2$ were observed on the polyimide layer near the etched pattern edge. In order to completely remove the etch residues, the over-etching time was obliged to get longer so that the undercut amount of the $Cr.SiO_2$ layer was greatly increased. The adhesion of the resist was poor so that the resist came off during the washing with water.

The other comparative examples were poor in any one of the inspected properties. In Comparative Example 4, a liquid etchant composition comprising hydrofluoric acid, hydrochloric acid and potassium chloride was used in order to strengthen the etching power for chromium and avoid the formation of the eave of aluminum. The eave was not produced but the aluminum layer was excessively etched to damage the edge shape of the $Cr.SiO_2$ layer. The adhesion of the resist was poor. The etch residues could not be completely removed. Then, in Comparative Example 5, ammonium fluoride was added, which is experimentally known to improve resist adhesion. In this case, the undercut amount of $Cr.SiO_2$ was zero (0), and the undercut-free $Al/Cr.SiO_2$ laminate was obtained. However, there was observed a large amount of etch residues. Comparative Example 6 used a liquid composition containing phosphoric acid added thereto to raise the viscosity of the composition and inhibit the undercut of the $Cr.SiO_2$. The etch residues were not observed at all. However, an undercut of about 5 μm was unexpectedly observed. Thus, the addition of phosphoric acid gave good results for the etch residues but bad results for the undercut when the amount of phosphoric acid was large.

Comparative Examples 7 to 9 were intended to obtain the synergetic effect of Comparative Examples 4 and 5. Particularly, the concentration of hydrofluoric acid was changed in each of these comparative examples. In both of these comparative examples, the etch residues of $Cr.SiO_2$ were not observed at all. The pattern shape became poorer and the undercut amount was decreased as the content of hydrofluoric acid was increased.

As is clear from the foregoing, the present invention provides a high performance $Cr.SiO_2$-etchant composition, particularly liquid etchant compositions for wet-etching an $Al/Cr.SiO_2$ laminate with the $Cr.SiO_2$ resistor layer therein without undercutting the $Cr.SiO_2$ layer and with forming an undercut-free shape at the end of the $Al/Cr.SiO_2$ laminate, and further a method of etching the $Cr.SiO_2$ resistor layer. The liquid etchant composition of the present invention is particularly effective for etching integrated circuits containing an organic insulating film of, for example, polyimide therein. That is, little or no residues of $Cr.SiO_2$ are produced when etched. The liquid etchant composition of the present invention allows the etching process to be carried out with good reproducibility. The undercut-free shape of the $Al/Cr.SiO_2$ laminate pattern edge does not allow any microcrack formation in an aluminum electrode formed in the subsequent deposition step at the edge of $Al/Cr.SiO_2$ laminate pattern. Therefore, the present invention can provide terminal resistor elements with high reliability in packaging boards, such as a microchip carrier or multichip module boards, for integrated circuits.

With the liquid etchant composition of the present invention, etching of the $Al/Cr.SiO_2$ laminate can be continuously performed by using Al etchant and then $Cr/SiO_2$ etchant with only one photoresist pattern. The photoresist does not come off during the series of etching. Therefore, use of the liquid etchant composition of the present invention permits to provide the greatly simplified process.

Furthermore, since the liquid etchant composition has a strong etching power, this etching power is not lost even for the $Cr.SiO_2$ resistor film formed on the organic insulating film. Therefore, the liquid etchant composition of the present invention can cope with some change of the $Cr.SiO_2$ film properties under mass production conditions and then has a wide margin of tolerance for $Al/Cr.SiO_2$ film deposition processes and is independent of substrates.

What is claimed is:

1. A method of forming a thin film resistor element comprising a laminate comprising a chromium, silicon and oxygen-containing film as a resistor and an aluminum film as a conductor on a substrate, which comprises preparing the chromium, silicon and oxygen-containing film on the substrate and subsequently the aluminum film on the chromium, silicon and oxygen-containing film to form a laminate, providing a photoresist pattern on the aluminum film, etching the aluminum film and then etching the chromium, silicon and oxygen-containing film with an aqueous etchant composition consisting of 1.92 to 2.64 mol/l of hydrochloric acid, 0.26 to 0.77 mol/l of phosphoric acid, 5 to 10 mol/l of hydrofluoric acid and 3.2 to 5.4 mol/l of ammonium fluoride.

2. The method according to claim 1, wherein the chromium, silicon and oxygen-containing film is prepared by sputtering.

3. The method according to claim 1, wherein there is present a polyimide coating between the substrate and the chromium, silicon and oxygen-containing film.

4. A method of etching a thin film of a resistor material comprising at least chromium, silicon and oxygen, said film being formed on a substrate, and said thin film having an aluminum film applied thereto, which comprises etching the aluminum film to expose a portion of the thin film of the resistor material, then etching the exposed thin film of resistor material with a liquid etchant composition consisting of water, hydrochloric acid, phosphoric acid, hydrofluoric acid and ammonium fluoride; the concentration of the hydrochloric acid being in the range of 1.92 to 2.64 mol/l, the concentration of the phosphoric acid being in the range of 0.26 to 0.77 mol/l, the concentration of the hydrofluoric acid being in the range of 5 to 10 mol/l and the concentration of the ammonium fluoride being in the range of 3.2 to 5.4 mol/l.

5. The method according to claim 4, wherein the thin film of a resistor material comprises a chromium-silicon dioxide sputtered thin film and the substrate comprises a ceramic material or glass.

* * * * *